(12) United States Patent
Backmann et al.

(10) Patent No.: US 11,186,012 B2
(45) Date of Patent: Nov. 30, 2021

(54) METHOD FOR PERFORMING A MATERIAL CHANGE IN A FEEDING DEVICE OF AN EXTRUDER

(71) Applicant: Windmöller & Hölscher KG, Lengerich (DE)

(72) Inventors: Martin Backmann, Lengerich (DE); Tobias Kulgemeyer, Hagen a.T.W (DE); Gerhard Middelberg, Lengerich (DE)

(73) Assignee: WINDMÖLLER & HÖLSCHER KG, Lengerich (DE)

( * ) Notice: Subject to any disclaimer, the term of this patent is extended or adjusted under 35 U.S.C. 154(b) by 273 days.

(21) Appl. No.: 16/342,893

(22) PCT Filed: Oct. 17, 2017

(86) PCT No.: PCT/EP2017/076511
§ 371 (c)(1),
(2) Date: Apr. 17, 2019

(87) PCT Pub. No.: WO2018/073263
PCT Pub. Date: Apr. 26, 2018

(65) Prior Publication Data
US 2020/0047374 A1    Feb. 13, 2020

(30) Foreign Application Priority Data

Oct. 17, 2016    (DE) .................... 10 2016 119 754.8

(51) Int. Cl.
*B29B 7/78*    (2006.01)
*B29C 48/92*    (2019.01)
(Continued)

(52) U.S. Cl.
CPC .............. *B29B 7/78* (2013.01); *B29B 7/60* (2013.01); *B29C 31/02* (2013.01); *B29C 31/10* (2013.01);
(Continued)

(58) Field of Classification Search
CPC .. B29B 7/78; B29B 7/38; B29B 7/603; B29B 7/428; B29B 7/60; B29C 48/92;
(Continued)

(56) References Cited

U.S. PATENT DOCUMENTS 4,486,100 A * 12/1984 Endo ....................... B29C 48/92
366/76.93
5,282,548 A * 2/1994 Ishihara .................. B29B 7/603
222/55
(Continued)

FOREIGN PATENT DOCUMENTS

DE         4214081          11/1992
DE       19939042 A1 *     3/2001    ........... B29C 48/285
(Continued)

OTHER PUBLICATIONS

International Application No. PCT/EP2017/076511, International Search Report and Written Opinion dated Jan. 23, 2018.
International Application No. PCT/EP2017/076511, International Preliminary Report on Patentability dated Feb. 1, 2019.

*Primary Examiner* — Charles Cooley
(74) *Attorney, Agent, or Firm* — Sheppard, Mullin, Richter & Hampton LLP (57) ABSTRACT

A method changes the material from a feed mixture to a subsequent mixture in a feed device of an extruder, the method comprising the steps of detecting a change request for changing the material, emptying a mixing area of a mixing device of the feed device, identifying the completion of the emptying of the mixing area, and filling the mixing
(Continued)

area of the mixing device with the subsequent mixture after the completion of the emptying has been identified.

11 Claims, 5 Drawing Sheets (51) Int. Cl.
*B29C 48/285* (2019.01)
*B29C 31/02* (2006.01)
*B29C 31/10* (2006.01)
*B29B 7/60* (2006.01)

(52) U.S. Cl.
CPC .......... *B29C 48/286* (2019.02); *B29C 48/287* (2019.02); *B29C 48/92* (2019.02); *B29C 2948/9259* (2019.02); *B29C 2948/92066* (2019.02); *B29C 2948/92228* (2019.02); *B29C 2948/92304* (2019.02)

(58) Field of Classification Search
CPC ..... B29C 48/287; B29C 48/286; B29C 31/02; B29C 31/10; B29C 2948/92066; B29C 2948/92304; B29C 2948/9259; B29C 2948/92228; B29C 45/18
USPC ....... 366/76.1, 76.2, 76.6, 76.9–76.93, 183.1
See application file for complete search history.

(56) References Cited

U.S. PATENT DOCUMENTS

| | | | |
|---|---|---|---|
| 7,897,093 B2* | 3/2011 | Jones | B29C 45/18 |
| | | | 264/328.8 |
| 8,690,417 B2* | 4/2014 | Graf | B29C 48/92 |
| | | | 366/76.2 |
| 2015/0367553 A1 | 12/2015 | Backmann | |
| 2018/0162034 A1* | 6/2018 | Avermeyer | B29C 48/2563 |
| 2020/0047374 A1* | 2/2020 | Backman | B29C 31/10 |
| 2021/0154900 A1* | 5/2021 | Wen | B29C 45/18 |

FOREIGN PATENT DOCUMENTS

| | | | | |
|---|---|---|---|---|
| DE | 202004015743 | 2/2006 | | |
| DE | 102004051196 | 4/2006 | | |
| DE | 102010028786 | 11/2010 | | |
| DE | 102013100812 | 7/2014 | | |
| EP | 0419903 | 4/1991 | | |
| EP | 0507689 A2 * | 10/1992 | ............... | B29B 7/72 |
| EP | 2939960 | 11/2015 | | |
| JP | S5769026 A | 4/1982 | | |
| JP | S60110411 | 6/1985 | | |
| JP | S62212121 | 9/1987 | | |
| JP | 2012176599 A | 9/2012 | | |
| WO | 2011007712 | 1/2011 | | |
| WO | 2011007713 | 1/2011 | | |

* cited by examiner

METHOD FOR PERFORMING A MATERIAL CHANGE IN A FEEDING DEVICE OF AN EXTRUDER

CROSS-REFERENCE TO RELATED APPLICATIONS

This application is a national stage application pursuant to 35 U.S.C. § 371 of International Application No. PCT/EP2017/076511, filed Oct. 17, 2017, which claims priority to German Patent Application No. 10 2016 119 754.8, filed Oct. 17, 2016, the disclosures of which are hereby incorporated by reference herein.

TECHNICAL FIELD

The present invention concerns a method for performing a material change from a feed mixture to a subsequent mixture in a feeding device of an extruder as well as a correspondingly operable feeding device for an extruder.

BACKGROUND

It is well known that extruders are used to process material mixtures, especially from different plastic granulates. In an extruder, processing is usually performed by a screw conveyor, which is heated. The temperature control and shear forces applied within the screw melt the corresponding feed mixture providing liquid for further processing in a nozzle area of the extruder. Such extruders are used in plastics processing and are used, for example, in the manufacture of films, especially blown films. Such extruders can be used as single extruders or as extrusion devices with two or more extruders connected in parallel. In order to supply the respective extruder with a feed mixture, feeding devices are known, which are configured in several parts. Usually the feed mixture, i.e. the mixture of two or more feed materials, is fed to the extruder via a transfer area. To ensure that there is sufficient mixing of the individual feed materials to the feed mixture, it is also known to use a mixing device to perform mixing, for example mechanically, before the transfer area is supplied with the feed mixture. The mixing device in turn receives the feed materials from a dosing container, with which the individual volume components or weight components of the individual feed materials can be matched and adapted to each other. The dosing device, in turn, receives the respective feed material from individual storage containers upstream, whereby each storage container is usually configured for a specific type of feed material. Each extruder is therefore often equipped with two or significantly more, up to eight or ten individual storage containers, in order to be able to process formulations of any complexity and correspondingly complex compound feed mixtures of the individual feed materials.

The disadvantage of the known solutions is that the material change is very complex. A material change is understood to mean a changeover from a feed mixture to a subsequent mixture as a formulation. A feed mixture and a subsequent mixture are defined compositions in weight proportions and in the corresponding specificity of the individual feed materials or subsequent materials. The composition of the feed mixture differs from the composition of the subsequent mixture. In order to perform such a material change with the known solutions, the new subsequent mixture is usually dosed from the storage container via the dosing container into the mixing device. In the mixing device, a mixing of the feed mixture still contained therein with the subsequent mixture already fed is thus produced over a certain period of time. As soon as a certain transition period has elapsed, the proportion of the subsequent mixture in the mixing device is so large that the extruder can now run the desired production again with the new formulation. A disadvantage of the known solutions, however, is that in the transition phase, when the subsequent mixture is still mixed with the feed mixture within the mixing device, the result at the end of the extruder does not have the desired defined material properties. Rather, a production is still performed at this point in time in an undefined manner, in which the production result is dependent on the mixing between the feed mixture and the subsequent mixture actually set at this point in time.

Product results produced during this period are usually scrap and cannot be reused, nor can they be recycled back to the overall system through regranulation.

SUMMARY

It is the object of the present invention to at least partially eliminate the disadvantages described above. In particular, it is the object of the present invention to perform the material change in a cost-efficient and simple manner as quickly as possible and/or as pure as possible.

The above object is solved by a method with the features of claim 1 and a feed device with the features of claim 11. Further features and details of the invention result from the dependent claims, the description and the drawings. Features and details which are described in connection with the method in accordance with the invention naturally also apply in connection with the device in accordance with the invention and vice versa, so that with regard to the disclosure of the individual aspects of the invention, reference is or can always be made to each other.

In accordance with the invention, a method is proposed for performing a material change from a feed mixture to a subsequent mixture in a feeding device of an extruder. Such a method has the following steps:

Detect a change requirement request to execute the material change,

Emptying a mixing area of a mixing device of the feed device,

Detect the end of emptying the mixing area,

Filling of the mixing area of the mixing device with the subsequent mixture after the detected end of emptying.

According to the invention, a material change should also be performed, as is also the case with known methods. A material change is therefore the change in the formulation used in the extruder. The feed mixture and the subsequent mixture therefore differ by at least one corresponding component, so at least one subsequent material is different from the corresponding feed material. This may also be the case if the subsequent mixture contains fewer individual components than the feed mixture. In principle, however, it is also conceivable that the subsequent mixture is run with the same sum and the same type of individual components, as is the case with the feed mixture, but different concentrations of the individual components result in a different subsequent mixture.

A core idea of the present invention is now to no longer perform the material change with the mixing device completely filled. Rather, a mixing area of the mixing device is emptied before the subsequent mixture is introduced into the mixing device. In the sense of the present invention, the mixing area of a mixing device means the area of the mixing device in which mixing of the individual components actually takes place. It should be noted that a wide variety of possibilities are conceivable as mixers. In addition to mechanically engaging blades, vibration mixers, worm drives or similar devices are of course also conceivable in the sense of this invention. Depending on the type of mixer used, an area will develop in which an actual and effective mechanical mixing of the individual components takes place. If the individual components of the feed mixture or the subsequent mixture are introduced from the respective storage container into the dosing container, they are usually present there in layers one on top of the other. This layer structure is essentially transferred unmixed into the mixing device, i.e. usually discharged by gravity. The mixing in the mixing area ensures that the mixture is as homogeneous as possible, so that the resulting mixture in the extruder has the desired production properties within the extruder as homogeneous as possible.

According to the invention, a step of emptying this mixing area is now performed after recognizing the change request to perform this material change. This means that the mixing device is not completely emptied, but rather at least the area of feed material is cleared in which the mixing movement or mixing function is provided by the mixing device. Emptying this mixing area can be done in a variety of ways, as will be explained later. As soon as the mixing area has been emptied to such an extent that there is no feed material left here, the mixing area is filled with the subsequent mixture in the final step of a method according to the invention. At this point in time, it goes without saying that feed mix can still be arranged in the mixing device below the mixing area. However, because the subsequent mixture now completely fills this mixing area when it is introduced into the mixing area of the mixing device, the subsequent mixture is mixed only with itself and no longer with residual components of the feed mixture, as was the case with known solutions up to now. In other words, the filling level of the mixing device is drained or drained off to such an extent that the mixer of the mixing device is empty, so to speak. The now emptied mixing area is filled with the subsequent mixture, so that the subsequent mixing function is now used exclusively or essentially exclusively for mixing the pure subsequent mixture. The resulting phase boundary between the subsequent mixture and the feed mixture therefore remains essentially constant during further conveying of the entire material in the direction of the extruder, especially in a transfer area, so that the problem of mixing in the known methods is only present for a minimal period of time. As soon as the phase boundary has reached the extruder, the feed mixture is essentially switched over to the subsequent material, so that only the subsequent mixture within the extruder can reach the inlet of the extruder.

As can be seen from the above description, mixing between the feed mixture and the subsequent mixture is now essentially completely avoided. As a result, a time transition range in which a mixture of feed mixture and subsequent mixture is produced as a production result is reduced to a minimum time span. Compared to the known solutions this is several minutes up to half an hour. This time span can now be achieved as a time gain for each material change between a feed mixture and a subsequent mixture. In addition to saving time, which is an economic advantage, a reduction in waste can also be achieved, so that the raw materials used can be processed more efficiently. The individual steps of the method are preferably performed automatically or semi-automatically. For example, the change request can be recognized by a sensor system or specified by a control system. Such a control system can also be used to control flaps or valves for the emptying and refilling steps.

It can be advantageous if at least one of the following partial steps are performed in a method for emptying the mixing area according to the invention:

Draining the feed mixture from the mixing area via a drainage opening

Emptying of the feed mixture into the extruder

The above list is a non-exhaustive one. Of course, the individual partial steps can also be combined with each other. It is conceivable that a separate drain opening is provided in a mixing device in order to clear the mixing area of the feed mixture. This drain opening can, for example, be coupled with a corresponding drain container in which the feed mixture can run off. Of course, it is also conceivable to ensure controlled emptying of the mixing area by simply removing the feed mixture from the mixing device by further processing in the extruder. As soon as the filling level in the mixing device has dropped so low as a result of the further production of the extruder and a lack of refilling in the mixing device that the mixing area is clear of the feed mixture as a result of this emptying, the final step can be performed in accordance with the invention, namely filling the mixing area with the subsequent mixture. The step of emptying, in particular automatically controlled, further reduces scrap or waste during a material change and thus significantly increases the efficiency of using a method according to the invention.

It can also be advantageous if, in a method in accordance with the invention, the mixing area is separated from a transfer area of the mixing device to the extruder by means of a closer means during filling of the mixing area with the subsequent mixture. The closure means may have a type of valve, for example a slide valve. As soon as the mixing area has been cleared of the feed material, the mixing area is empty, so to speak. In order to keep the already mentioned phase boundary between the feed mixture and the subsequent mixture as exact as possible, this transfer area, in which the feed mixture is still present, is physically separated from the mixing area by a sealing agent. This can be done automatically by a control device. Now the filling with the subsequent mixture takes place, which is prevented by the sealing agent from entering into the transfer area. In this way, the distance between the feed mixture and the subsequent mixture is increased and the phase boundary between the feed mixture and the subsequent mixture can be formed more precisely. After completion of the filling method, the sealing agent can of course be opened in order to allow the subsequent mixture to enter into this transfer area. This takes place in particular before this transfer area is completely empty in order to supply the extruder with material continuously or essentially continuously and thus prevent the extruder from running empty.

In the case of a method referred to in the preceding paragraph, it may be advantageous if, after and/or during filling with the subsequent mixture, a mixer of the mixing device is operated in order to mix the subsequent mixture, in particular before the closure means is opened to the transfer area. As already explained in the previous paragraph, the phase boundary between the feed mixture and the subsequent mixture can be made even more precise by the configuration of this method described above. In order to make the operation even more efficient, a mixing of the individual subsequent materials, which still reach the mixing device in unmixed form, is now performed before the closure means is opened. This means that the individual subsequent materials, which enter the mixing device in an unmixed manner, are first mixed before they enter the extruder via the transfer area. This can also be understood as a preferably automatic pre-mixing during the material change. In particular, because no separate thorough mixing is performed when the individual components of the subsequent material enter the mixing device, this premixing can now take place with the already existing mixer, so that the period of time in which unsaleable scrap are produced by the extruder is further reduced and the speed of switching between the feed mixture and the subsequent mixture is significantly increased.

A further advantage is if, in a method according to the invention, the mixing area, especially a mixer in the mixing area, is cleaned before the mixing area is filled with the subsequent mixture. A cleaning can be performed by different methods individually or in a combined way. Thus, cleaning can be performed with air pressure, suction mechanisms, knocking, vibration, ultrasound, a mixer drive or manually. This not only reduces contamination inside the mixing device, but also significantly reduces the generation of dust. Separate blow-out openings to the outside or the extraction of dust are also conceivable in the context of such a cleaning. Of course, such a cleaning method can also be performed if no material change is to take place. It is, of course, conceivable to empty the mixing area in an appropriate manner during a running method in a feed mixture, to perform the cleaning method and, finally, to refill the mixing area with the feed mixture that can still be operated. Cleaning is performed in particular by automatic or semi-automatic cleaning devices.

A further advantage may be if, in the case of a method in accordance with the invention, the filling level in a transfer area of the mixing device to the extruder is monitored, with at least one of the following steps being performed if the filling level in the transfer area falls below a minimum level:
  Immediate filling of the mixing area and/or the transfer area
  Reduction of the production speed of the extruder
  Stop of the production of the extruder In order to guarantee production reliability, it is desirable that the extruder does not run empty in any method situation. Sensors in particular are used to automatically monitor the filling level in the transfer area. Various emergency mechanisms are conceivable to ensure a minimum filling level in the transfer area, so that emptying of the extruder is effectively avoided. Of course, the individual emergency mechanisms can also be freely combined with each other. Stopping the production of the extruder is the last resort to avoid possible damage inside the extruder or during production. Immediate filling of the mixing area with feed mixture or with subsequent mixture is usually the first choice. The same applies to reducing the production speed of the extruder without impairing the production capability of the extruder or downstream units or components.

A further advantage is when the production speed of the extruder is reduced during the steps of emptying the mixing area and/or filling the mixing area in a method according to the invention. A control system can perform this automatically or semi-automatically. In other words, to perform the emptying, the extrusion speed is lowered to create a longer time span to provide filling of the mixing area. In particular, if the transfer area is relatively small or operates at high production speeds, this leads to relatively short buffer times in which the transfer area still provides sufficient material for the extruder. The reduction of the production speed for performing the material change accordingly increases this buffer time, without a mechanical change having to be performed for an increase in volume in the transfer area. The corresponding duration for this material change, in particular for filling, is usually in the range of 20 to 30 seconds, so that in particular an additional cleaning step can be performed in the described manner.

In addition, it may be advantageous if, in a method according to the invention, at least one of the following steps, in particular in the following sequence, is performed before the mixing area is emptied:
  Emptying at least one storage container upstream of the mixing device
  Filling the storage container with a subsequent material for the subsequent mixture
  Emptying a dosing container upstream of the mixing device and downstream of the storage container
  Filling the dosing container from the at least one storage container with the subsequent material of the subsequent mixture During the continuous processing of the preceding steps, a cascaded filling takes place so that during operation the feed mixture is first applied to the storage container and then to the dosing container with the subsequent material or mixture, while the extruder still processes the end of the current formulation conditions with the feed mixture. In other words, the upper part of the feed device is now already prepared for the subsequent mixing, so that the final part, i.e. the filling of the mixing area of the mixing device with the subsequent mixture, can be performed much faster and thus more efficiently. The individual steps alone are also conceivable as preparatory steps in order to be able to guarantee the core idea of increasing efficiency, preferably in automatic execution.

A further advantage is when the level in at least one of the storage containers and/or the level in the dosing container is reduced in a method for preparing the material change according to the invention. Usually, the storage containers from large containers or sack containers are supplied with the respective material for the feed mixture or the subsequent mixture, for example by means of a suction conveyor. Thus, both the dosing container and the storage container represent a template, which is provided with a corresponding filling level. Corresponding level sensors can provide information about this level. At the end of the formulation of the feed mixture, which end is known via the method control, this feed quantity can already be reduced, so that the reduction or emptying of the storage container and/or the emptying of the dosing container can be performed significantly faster for the material change. The cascade described in the previous paragraph can be performed even faster and more efficiently through this preparation of the material change.

In addition, it may be advantageous if, in a method according to the invention, at least one production parameter of the extruder is adapted to the subsequent mixture during and/or after filling the mixing area with the subsequent mixture. This can also be done automatically by means of a control device. This means that production parameters, such as the production speed and/or the temperature profile in the extruder, are adapted to the corresponding subsequent mixture and the individual components used therein. The preparation, in particular for a changed temperature profile, allows this changeover to be already indicated or started at the end of a formulation in order to be able to perform production at the start of the new formulation with the subsequent mixture with the most ideal temperature conditions or production parameters possible.

Another object of the present invention is a feed device for an extruder, having at least two storage containers for receiving different feed materials, at least one dosing container for receiving and dosing feed materials, and a mixing device for mixing the feed materials to form a feed mixture in a mixing area. With a transfer area, the mixed feed mixture can be transferred to the extruder. A recording device may be used to perform a method according to the invention in an automated manner so that the presentation device has the same advantages as have been explained in detail with reference to a method according to the invention.

BRIEF DESCRIPTION OF THE DRAWINGS

An invention-based feeding device can be further developed by the mixing area and/or the transfer area and/or the dosing container and/or the storage container having a sensor device for detecting the respective filling level. Such a sensor device is capable of directly or indirectly determining the corresponding level in a wide variety of ways. Simple level sensors are just as capable as weight detection, volume detection or a corresponding coupling with the method control system.

Further advantages, features and details of the invention result from the following description, in which embodiments of the invention are described in detail with reference to the drawings. The features mentioned in the claims and in the description may be essential to the invention either individually or in any combination. They show schematically:

FIGS. 1 to 5 explain in more detail how a method according to the invention operates. The starting point is an extruder 100 in operation, which is supplied with a feed mixture EM by the feed device 10.

DETAILED DESCRIPTION

Figure 1:
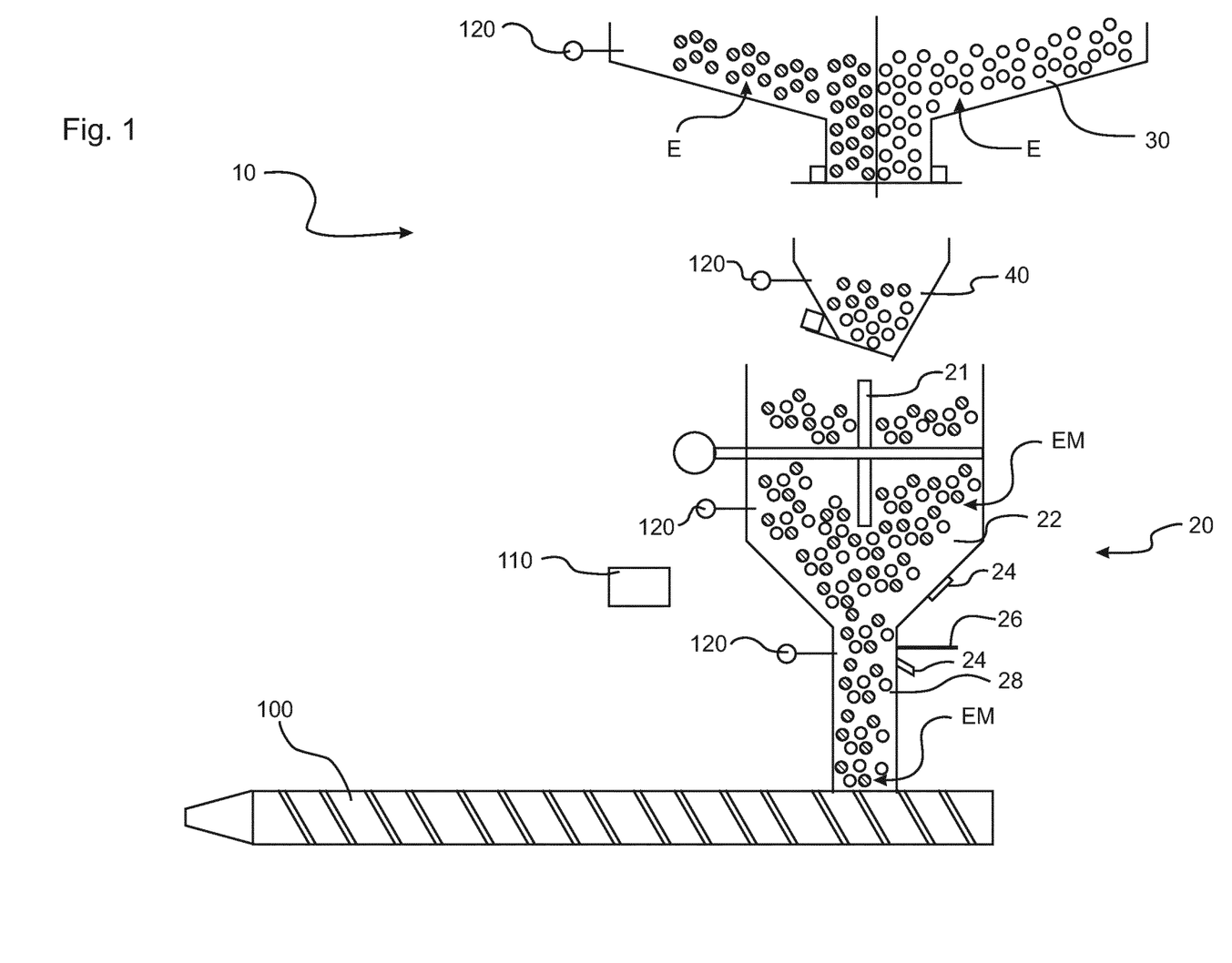
FIG. 1 an ingenious feed device according to the invention when using the feed material, FIG. 2 The embodiments of FIG. 1 with emptied container, FIG. 3 The embodiments of FIGS. 1 to 2 with empty dosing container, FIG. 4 the embodiments of FIGS. 1 to 3 with filled mixing area and FIG. 5 the embodiments of FIGS. 1 to 4 after the material change.

In order to make the feed mixture EM available, a plurality of individual storage containers 30, here two pieces, is provided in the feed device 10. In each of these storage containers 30, a feed material E is arranged. With schematically illustrated sliders, it is now possible to feed the respective feed material E sequentially one after the other into a dosing container 40. The dosing container 40 can be equipped with a scale and/or a level sensor as sensor device 120. In the dosing container 40, a layer-by-layer structure of these individual feed materials E is thus produced by sequentially introducing the pure feed materials E. Subsequently, these individual feed materials E are discharged in layered form into the mixing device 20 and there into the mixing area 22 by opening a slide. With the aid of a mechanical mixer 21 shown here, the individual feed materials E are mixed to the feed mixture EM, which is fed to the extruder 100 via the transfer area 28.

Figure 2:
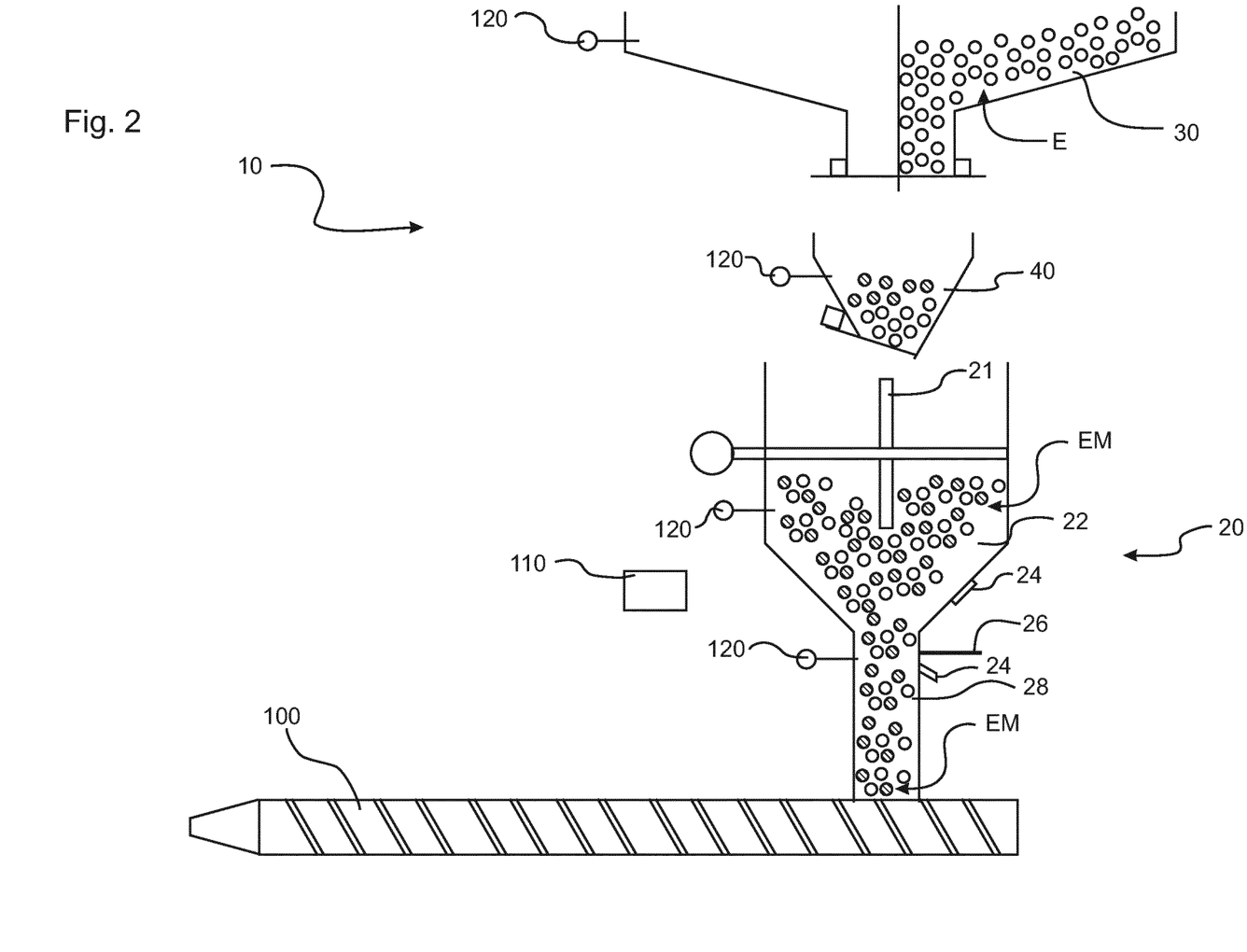
Figure 3:
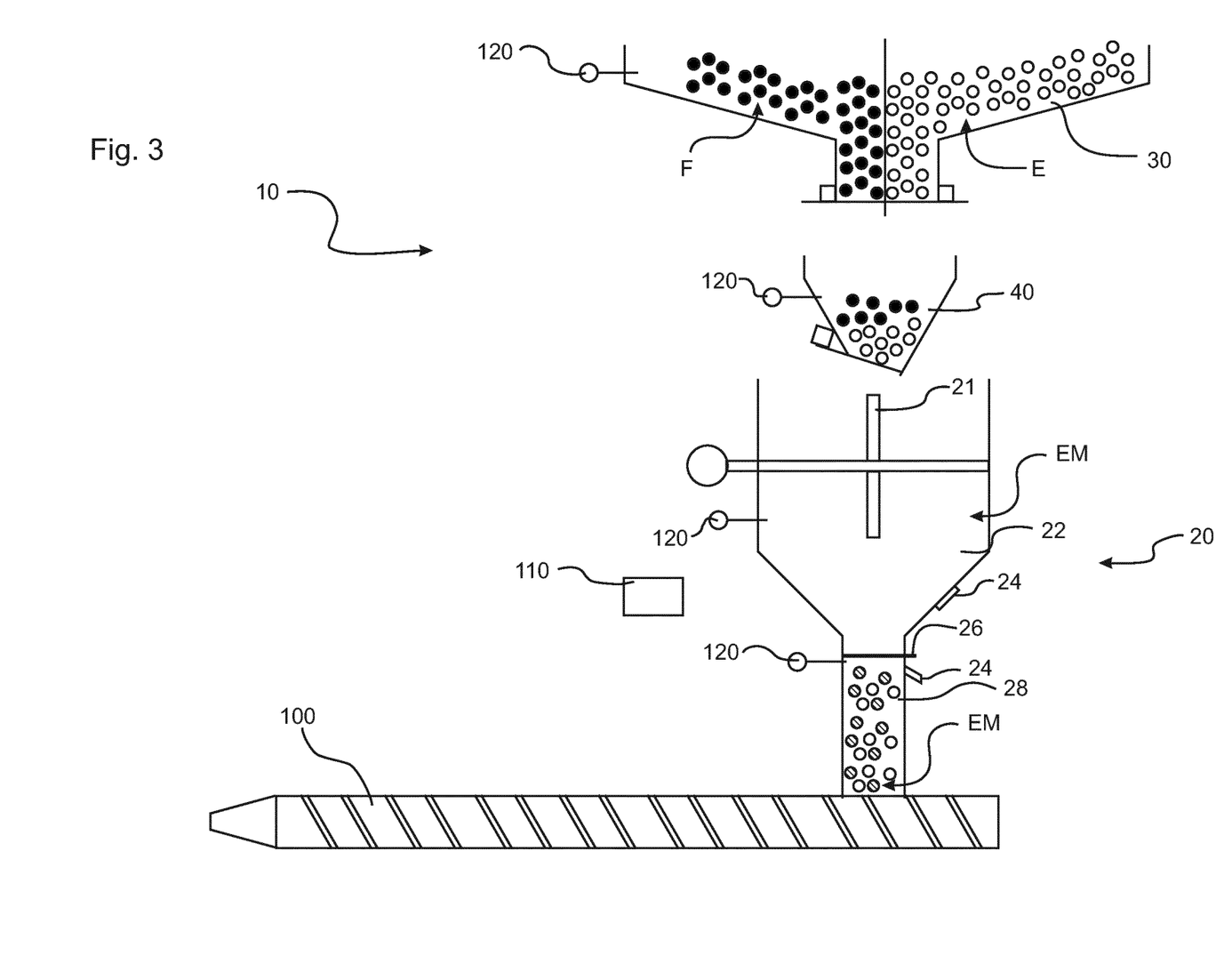
Figure 4:
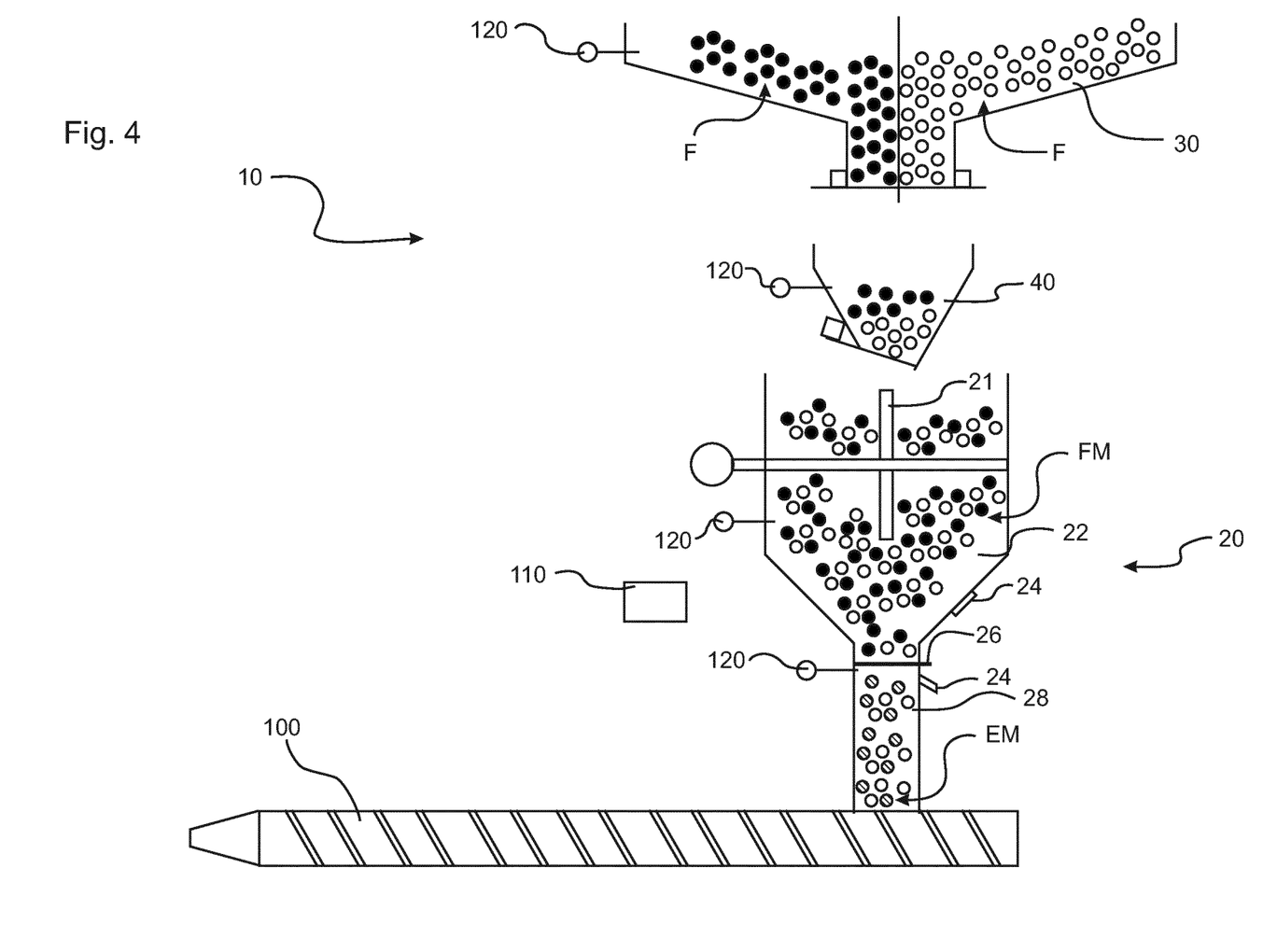
Figure 5:
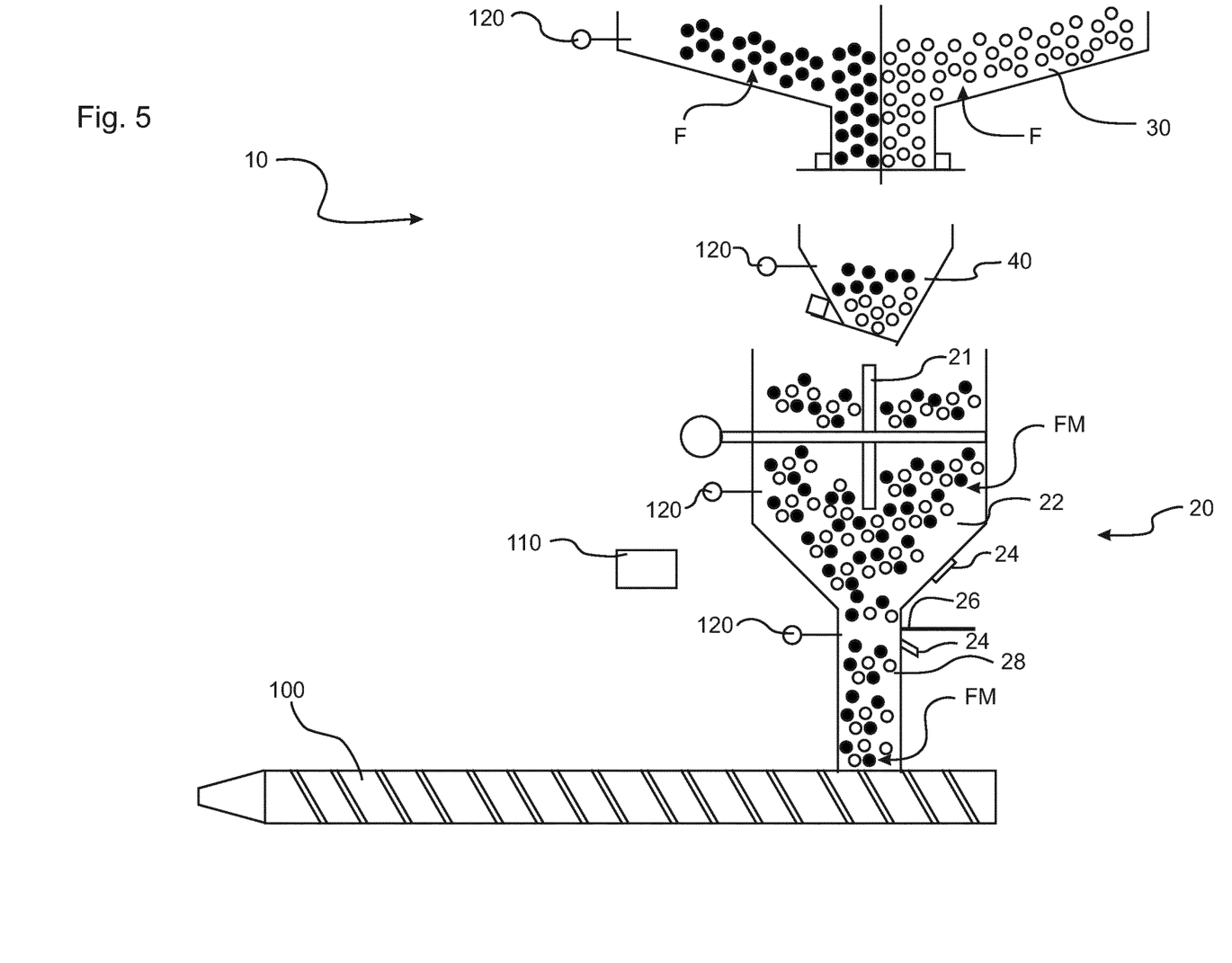

If a material change is now recognized, a large number of steps are necessary during the execution of the method. The core idea is that via FIGS. 2 and 3 the mixing area 22 of the mixing device 20 runs empty. Emptying is achieved here by further processing by the extruder 100 and by avoiding refilling via the dosing container 40. Of course, emptying via the separate drainage opening 24 is also conceivable in addition or alternatively. Such a drain opening 24 can be provided additionally or alternatively also in the transfer area 28. As soon as the mixing area 22 has been emptied, refilling can take place in this mixing area 22. As an option, a preparatory step above the mixing device 20 has already been performed for this refilling in the configuration of FIGS. 2 and 3. In FIG. 2, the feed material E in the right-hand hopper 30 was extracted or drained completely, so that the subsequent material F could now be introduced in accordance with FIG. 3. The same means that also in the dosing container 40, starting from the two subsequent materials F from the storage container 30 in FIG. 4, the dosing container 40 can now be filled accordingly with the new material mixture of the subsequent mixture FM. Now discharge into mixing area 22 and there mix with mixer 21 to produce the subsequent mixture FM.

The configuration of FIGS. 1 to 5 also includes a closure means 26 to separate the transfer area 28 from the mixing area 22. This means that mixing in mixing range 22 for the subsequent mixture FM can already take place when feed material EM is still being fed to the extruder 100 in transfer area 28. In the final case, when the closing means 26 is opened in accordance with FIG. 5, the subsequent mixture FM enters into the extruder 100 via the transfer area 28 and the production with the subsequent formulation of the subsequent mixture can be started.

The preceding explanation of the embodiment describes the present invention exclusively in the context of examples. Of course, individual features of the configuration forms can be freely combined with each other, if technically reasonable, without leaving the scope of the present invention.

REFERENCE CHARACTER LIST

10 Feed device
20 Mixing device
21 Mixer
22 Mixing area
24 Drainage opening
26 Closure means
28 Transfer area
30 Storage container
40 Dosing container
100 Extruder
110 Control device
120 Sensor device
E Feed material
EM Feed mixture
F Subsequent material
FM Subsequent mixture

The invention claimed is:

1. A method for performing a material change from a feed mixture to a subsequent mixture in a feed device of an extruder, comprising the following steps:
   detecting a change request to execute the material change,
   emptying a mixing area of a mixing device of a receiving device,
   detecting an end of emptying the mixing area,
   filling the mixing area of the mixing device with the subsequent mixture after the detected completion of emptying,
   wherein at least one of the following steps is performed prior to emptying the mixing area:

emptying at least one storage container which is mounted upstream of the mixing device, filling the at least one storage container with a subsequent material for the subsequent mixture, emptying a dosing container which is arranged upstream of the mixing device and downstream of the at least one storage container, filling the dosing container from the at least one storage container with the subsequent material of the subsequent mixture, wherein cascaded filling takes place so that, during operation with the feed mixture, first the at least one storage container and then the dosing container are acted upon with the subsequent material or the subsequent mixture, while the extruder still processes an end of current formulation conditions with the feed mixture.

2. The method according to claim 1, wherein, at least one of the following partial steps is performed for the step of emptying the mixing area:

draining the feed mixture from the mixing area via a drainage opening, emptying the feed mixture into the extruder.

3. The method according to claim 1, wherein, during the filling of the mixing area with the subsequent mixture, the mixing area is separated from a transfer area of the mixing device to the extruder.

4. The method according to claim 1, wherein, at least after or during filling with the subsequent mixture a mixer of the mixing device is operated in order to mix the subsequent mixture.

5. The method according to claim 1, wherein, the mixing area, is cleaned before the start of filling the mixing area with the subsequent mixture.

6. The method according to claim 1, wherein, the filling level in a transfer area of the mixing device to the extruder is monitored, at least one of the following steps being performed if the filling level in the transfer area falls below a minimum level:

immediate filling of at least the mixing area or the transfer area, reduction of the production speed of the extruder, stop of the extruder production.

7. The method according to claim 1, wherein, during the execution of the steps of at least emptying the mixing area or filling the mixing area, the production speed of the extruder is reduced.

8. The method according to claim 1, wherein, in order to prepare for at least the change of material, the filling level in the at least one storage container or the filling level in the dosing container is reduced.

9. The method according to claim 1, wherein, at least one production parameter of the extruder is adapted to at least the subsequent mixture during or after filling the mixing area with the subsequent mixture.

10. A feed device for an extruder, having at least two storage containers for receiving different feed materials, at least one dosing container for receiving and dosing feed materials and a mixing device for mixing the feed materials to form a feed mixture in a mixing area and having a transfer area for transferring the feed mixture to the extruder, further comprising a control device for performing a method for performing a material change from a feed mixture to a subsequent mixture in a feeding device of an extruder, comprising the following steps:

detecting a change request to execute the material change, emptying a mixing area of a mixing device of a receiving device, detecting an end of emptying the mixing area, filling the mixing area of the mixing device with the subsequent mixture after the detected completion of emptying, wherein at least one of the following steps is performed prior to emptying the mixing area:

emptying at least one storage container which is mounted upstream of the mixing device, filling the at least one storage container with a subsequent material for the subsequent mixture, emptying a dosing container which is arranged upstream of the mixing device and downstream of the at least one storage container, filling the dosing container from the at least one storage container with the subsequent material of the subsequent mixture, wherein cascaded filling takes place so that, during operation with the feed mixture, first the at least one storage container and then the dosing container are acted upon with the subsequent material or the subsequent mixture, while the extruder still processes an end of current formulation conditions with the feed mixture.

11. A feed device according to claim 10, wherein, at least the mixing area or the transfer area or the dosing container or the storage container has a sensor device for detecting the respective filling level.

* * * * *